(12) United States Patent
Butler et al.

(10) Patent No.: US 9,145,162 B2
(45) Date of Patent: Sep. 29, 2015

(54) COLLAPSIBLE STEERING COLUMN ASSEMBLY

(75) Inventors: Stephen Butler, Wolverhampton South Staffordshire (GB); John Hiles, South Wirral Cheshire (GB); Mark Anthony Wilkes, Birmingham West Midlands (GB)

(73) Assignee: TRW Limited, West Midlands (GB)

(*) Notice: Subject to any disclaimer, the term of this patent is extended or adjusted under 35 U.S.C. 154(b) by 0 days.

(21) Appl. No.: 14/125,143

(22) PCT Filed: May 21, 2012

(86) PCT No.: PCT/GB2012/051150
§ 371 (c)(1),
(2), (4) Date: Mar. 18, 2014

(87) PCT Pub. No.: WO2012/168689
PCT Pub. Date: Dec. 13, 2012

(65) Prior Publication Data
US 2014/0352480 A1    Dec. 4, 2014

(30) Foreign Application Priority Data

Jun. 10, 2011  (GB) .................................. 1109750.8

(51) Int. Cl.
  *B62D 1/11*    (2006.01)
  *B62D 1/19*    (2006.01)
  *B62D 1/184*   (2006.01)

(52) U.S. Cl.
  CPC ................ *B62D 1/195* (2013.01); *B62D 1/184* (2013.01)

(58) Field of Classification Search
  CPC ........... B62D 1/195; B62D 1/19; B62D 1/192

USPC ......................................................... 280/777
See application file for complete search history.

(56) References Cited

U.S. PATENT DOCUMENTS 5,722,299 A * 3/1998 Yamamoto et al. ............. 74/493
6,419,269 B1 * 7/2002 Manwaring et al. .......... 280/775
(Continued)

FOREIGN PATENT DOCUMENTS

GB    2451506 A    2/2009
GB    2454345 A    5/2009
(Continued)

OTHER PUBLICATIONS

Intellectual Search Report for GB 1109750.8 dated Sep. 29, 2011.
(Continued)

*Primary Examiner* — James English
(74) *Attorney, Agent, or Firm* — MacMillan, Sobanski & Todd, LLC

(57) ABSTRACT

A collapsible steering column assembly for a vehicle comprises a shroud which surrounds a steering column shaft, a mounting bracket secured to or integral with a fixed part of the vehicle, a support bracket secured to the mounting bracket through one or more frangible connectors, a clamp mechanism which releasably secures the shroud to the support bracket, and a blocking part which is fixed in position relative to the mounting and at least in an unclamped condition of the clamp mechanism provides an additional force path between the clamp mechanism and the mounting bracket that does not pass through the support bracket. In the event that an axial load is applied to the steering assembly when the clamp mechanism is unlocked and has reached the end of its allowable travel at least some of the load is carried through the clamp mechanism and the blocking part to the mounting bracket along the additional force path.

9 Claims, 8 Drawing Sheets

(56) References Cited

U.S. PATENT DOCUMENTS

| | | | |
|---|---|---|---|
| 6,948,741 B2 * | 9/2005 | Manwaring et al. | 280/775 |
| 8,919,220 B2 * | 12/2014 | Moriyama et al. | 74/493 |
| 2007/0252372 A1 * | 11/2007 | Spano et al. | 280/775 |
| 2008/0257097 A1 * | 10/2008 | Graf | 74/493 |
| 2009/0145258 A1 * | 6/2009 | Davies et al. | 74/495 |
| 2010/0300238 A1 * | 12/2010 | Ridgway et al. | 74/493 |
| 2011/0271787 A1 * | 11/2011 | Marable et al. | 74/493 |
| 2012/0024101 A1 * | 2/2012 | Schnitzer et al. | 74/492 |
| 2012/0318092 A1 * | 12/2012 | Kuroumaru | 74/492 |
| 2014/0260762 A1 * | 9/2014 | Streng | 74/493 |
| 2014/0352480 A1 * | 12/2014 | Butler et al. | 74/493 |

FOREIGN PATENT DOCUMENTS

| | | |
|---|---|---|
| JP | 2009190447 A | 8/2009 |
| WO | 2011114166 A1 | 9/2011 |

OTHER PUBLICATIONS

International Search Report for PCT/GB2012/051150 dated Sep. 17, 2012.

* cited by examiner

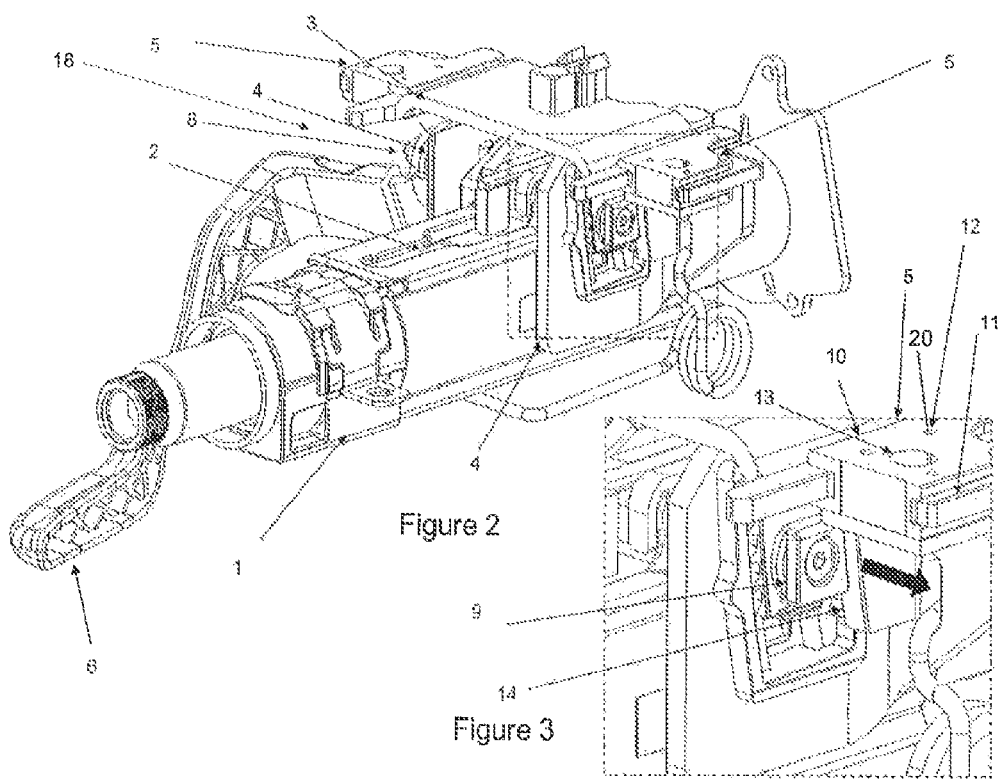

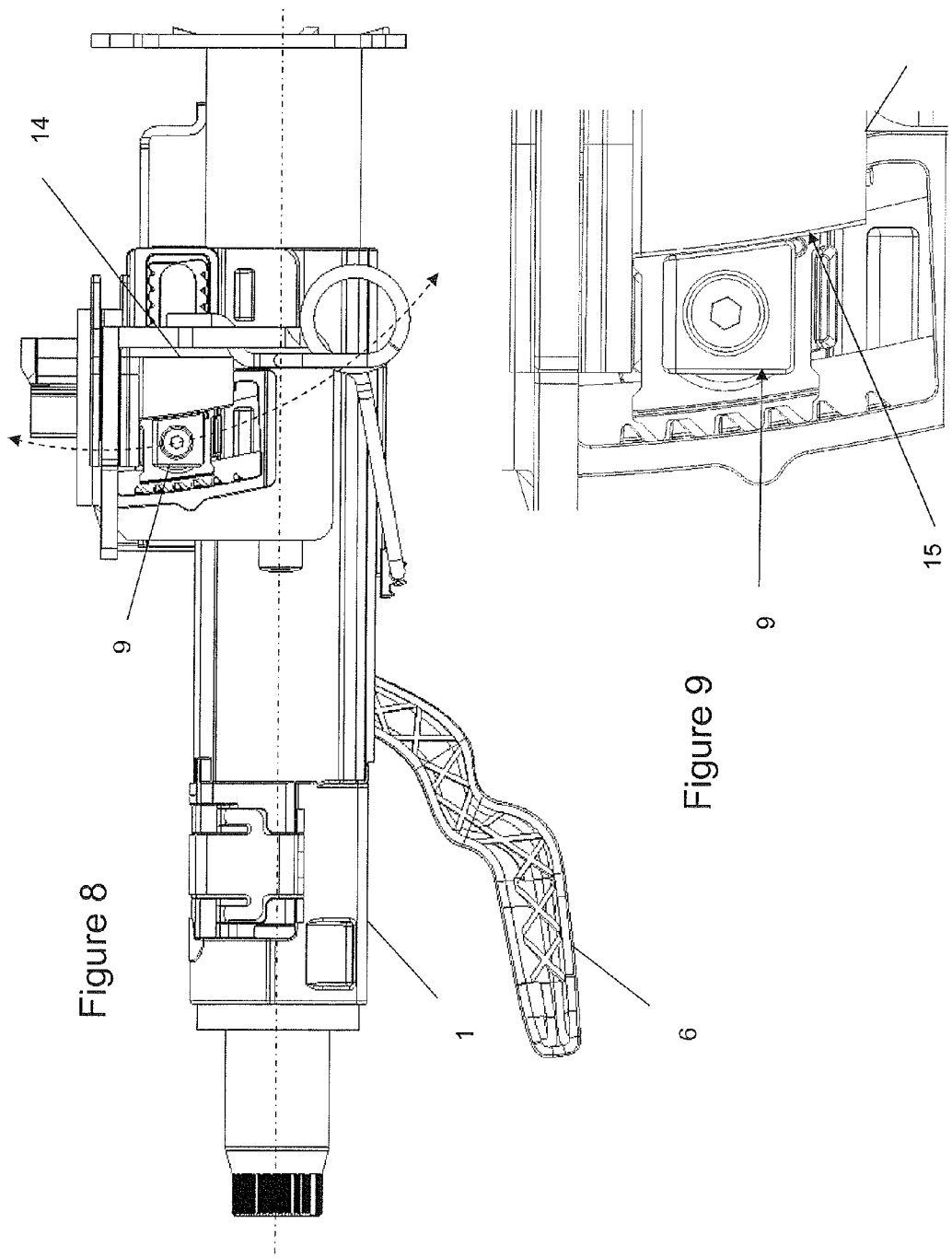

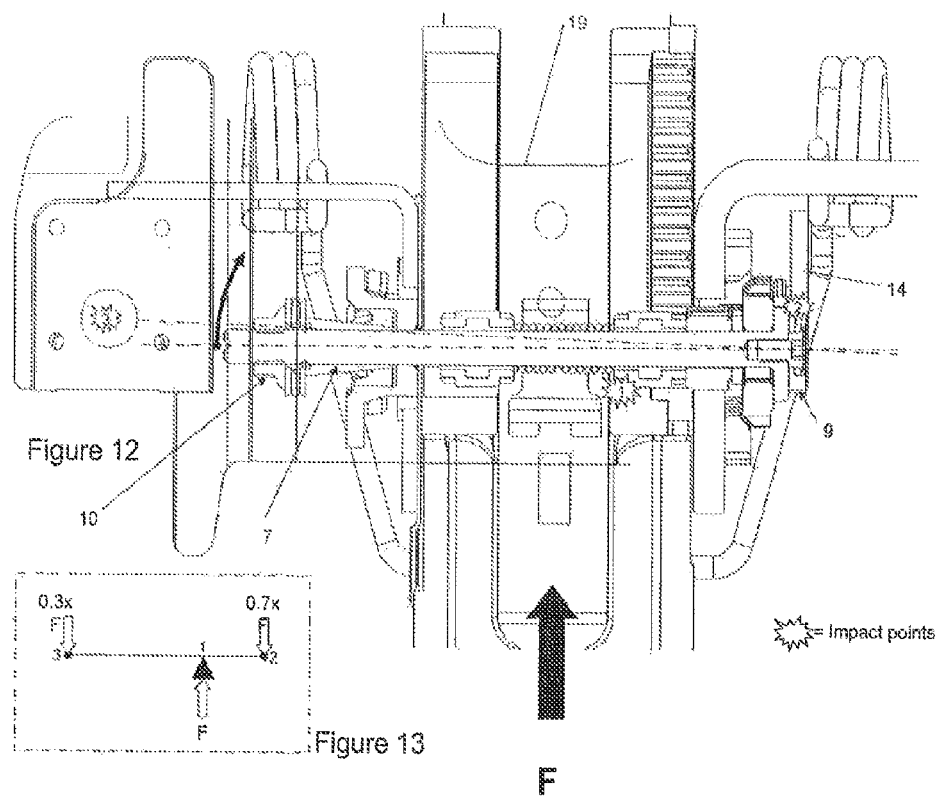

COLLAPSIBLE STEERING COLUMN ASSEMBLY

CROSS-REFERENCE TO RELATED APPLICATIONS

This application is a national stage of International Application No. PCT/GB2012/051150 filed May 21, 2012, the disclosures of which are incorporated herein by reference in entirety, and which claimed priority to Great Britain Patent Application No. GB 1109750.8 filed Jun. 10, 2011, the disclosures of which are incorporated herein by reference in entirety.

BACKGROUND OF THE INVENTION

This invention relates to improvements in collapsible steering column assemblies for vehicles that can collapse during a crash.

Steering column assemblies for automotive vehicles and the like are increasingly required to be adjustable for steering wheel height known as rake and, in many cases, steering wheel distance known as reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

A typical adjustable steering column assembly is constructed along the lines of the assembly shown in FIG. 1 of the drawings, and comprises a first shroud portion 100, a second shroud portion 200 and a clamp mechanism 300 that includes a support bracket 500 secured to a mounting bracket (not shown) which is in turn secured to a fixed part of a vehicle. Within the context of this description it should be understood that a mounting bracket will typically be fixed to, or form an integral part of, a Cross Car Beam (CCB) which runs from one side of a vehicle to the other forward of the driver behind the dashboard. The first and second portions 100, 200 are releasably engaged by the clamp mechanism 300 to selectively permit an amount of relative movement between the first and second portions that is required during adjustment of the steering column assembly. The clamp mechanism can be unlocked and locked by movement of a locking lever or handle or, sometimes, electrically using a motor or perhaps hydraulically or pneumatically. When the handle is unlocked it is possible to adjust the steering wheel 'reach' and "rake" position in & out only up to predetermined limits.

By releasing the clamp mechanism and telescopically sliding the first portion 100 over the second portion 200 the length of the shroud can be altered, altering the reach position of an associated steering wheel. By moving both portions together up and down relative to the clamp mechanism the rake can be adjusted. In some assemblies only one of reach and rake may be adjusted.

When the clamp mechanism is locked the length of the steering column assembly is fixed, and it is prevented from moving due to the rigid connection from the shroud, through the clamp mechanism to the rake bracket and on through the mounting bracket to the vehicle. In the event of a crash it is desirable for the steering column assembly to collapse in a controlled manner. This helps to reduce the forces of a driver colliding with the steering wheel or its airbag. In one known arrangement this controlled collapse is enabled by frangibly connecting the support bracket 500 to the vehicle using one or more frangible connectors in the form of shaped blocks called capsules 400. In a crash the forces on the bracket are sufficiently high to cause the bracket to break away from the capsules thus permitting the bracket to move relative to the vehicle.

A possible problem with this prior art arrangement is that if the clamp mechanism 300 is unlocked and an axial adjustment force F is applied to the steering column that is too high, it could cause the telescopic shroud to reach the end of its adjustment range with such a force that the capsules that fix the bracket to the vehicle body are damaged or even sheared. This is because the force load path is directly transferred to the connectors at extremes of travel. This would render the column partially or fully disengaged from the vehicle.

BRIEF SUMMARY OF THE INVENTION

According to a first aspect the invention provides a collapsible steering column assembly for a vehicle comprising:
a shroud which surrounds a steering column shaft,
a mounting bracket secured to or integral with a fixed part of the vehicle,
a support bracket secured to the mounting bracket through one or more frangible connectors which are adapted to break when subject to a predefined load to permit the support bracket to move relative to the mounting bracket,
a clamp mechanism which releasably secures the shroud to the support bracket, when unclamped the shroud being movable relative to the support bracket to permit the assembly to be adjusted for reach and when clamped the shroud being fixed in position relative to the bracket, and
a blocking part which is fixed in position relative to the mounting bracket and at least in the unclamped condition of the clamp mechanism provides an additional force path between the clamp mechanism and the mounting bracket that does not pass through the support bracket,
whereby in the event that an axial load is applied to the steering assembly when the clamp mechanism is unlocked and has reached the end of its allowable travel at least some of the load is carried through the clamp mechanism and the blocking part to the mounting bracket along the additional force path so as to protect the frangible connectors from breaking.

The blocking part may be fixed in position relative to the mounting bracket, and may form an integral part of the mounting bracket or, in at least one arrangement, a part of a component that is fixed rigidly to the mounting bracket.

The blocking part may comprise a first portion which will break away when subject to a relatively low load and a second portion which is relatively stronger, the clamp mechanism when in the locked condition engaging only the relatively weaker section of the blocking part and when in the unlocked position engaging the relatively stronger portion, such that in the event that an axial load is applied to the steering column assembly whilst the clamp mechanism is locked the relatively weaker portion of the blocking part will break away from the mounting bracket and subsequently permit the load to pass through the clamp mechanism to the mounting bracket through the frangible connectors.

By "break away" we mean that it may shear off or may deform (for example by compression or bending or torsion) in any other way to such an extent that it no longer carries the force applied to it immediately prior to breaking away to the mounting bracket. It may, for example, not completely shear off but simply become less rigid.

The assembly of the invention therefore provides for high loads to be earthed out by the blocking part directly to the mounting bracket to protect the frangible connectors when adjustments are made with the clamp mechanism unclamped.

However, when the clamp mechanism is clamped the high loads can pass instead through the frangible connectors which may break to allow the support bracket, and hence the clamp mechanism and shroud to move relative to the mounting bracket.

The blocking part may define a guide face along which a part of the clamp mechanism will slide upon moving from the clamped to unclamped positions and during adjustment for reach that extends continuously from the relatively strong to the relatively weak portions of the blocking part. Keeping the guide face in contact with the cap at all times helps ensure it is correctly positioned to provide the force path when required.

The clamp mechanism may include a clamp bolt and the shroud may include at least one elongate slot through which the bolt passes, the limits of reach adjustment being defined by the positions in which the bolt is located at the ends of the slot, the shroud being located between two downwardly depending arms of the support bracket, each arm including a further opening through which the clamp bolt passes, and at least a part of guide face of the blocking part engaging the clamp bolt in a region that lies outside of the two arms of the support bracket and towards one end of the bolt.

The clamp bolt may include a head or cap which engages the guide face, the head or other cap engaging the guide face in the weakened portion of the blocking part which clamped and moving along the axis of the clamp bolt when moved to the unclamped position to engage the guide face in the region of the stronger portion of the blocking mechanism. The continuous guide face allows it to slide relatively unimpeded relative to the stronger portion of the blocking part. The head or cap may be at the end of the bolt, or positioned at some other point along its length. The head or cap may define a further guide surface that is complimentary to the guide face of the blocking mechanism.

The cap may include a low friction guide surface, or may include a guide wheel. It may be threaded onto the clamp bolt.

When under an axial load in the unclamped position, the force applied to the steering assembly will pass from the clamp mechanism to the support bracket and the blocking part at the points where they contact the clamp bolt.

It would be preferable from a force path point of view for the clamp bolt to engage a blocking part at each end of the clamp bolt, or centrally on its axis, but in practice there is often not enough room to achieve this at the end of the bolt which carries the locking handle. The blocking part may therefore be located at the other end only.

Where the blocking part contacts the clamp bolt only at one end region of the bolt (not at both sides of the support bracket arms or centrally on the axis of the shroud) it will be observed in a practical assembly that the clamp bolt will tend to pivot about the region of contact with the blocking part to apply some load to the support arms, which is then transferred through the frangible connector to the mounting bracket. Typically, the support bracket will be connected to the mounting bracket by two frangible connectors—each offset from and on opposite sides of the axial centre line of the shroud. The connector that is on the same side of the shroud as the blocking part will come under less load then the other one as the clamp bolt pivots.

In one arrangement, therefore, to control the proportion of the load that passes along a path through that frangible connector that is furthest from the blocking mechanism to the mounting bracket relative to the proportion of the load carried by a combination of the other connector and the blocking mechanism to the mounting bracket, the connector that is furthest from the blocking mechanism may be offset from the axis of the shroud by a greater distance than the region where the clamp bolt contacts the blocking mechanism is offset from that axis.

In one arrangement, the distance to that connector may be substantially twice that of the distance to the blocking mechanism, so that twice the force passes through the additional path compared with the force passing through the frangible connector.

The load required to break the frangible connectors and the weakened portion of the blocking portion should be carefully selected to ensure that the connectors are protected when the assembly is unclamped whilst optimising the additional force needed to collapse the assembly during a crash.

The relatively stronger portion of the blocking part should be able to carry a load that exceeds the difference between the maximum expected load on the assembly and the load required to break the frangible connectors.

In a convenient arrangement, at least one of the frangible connectors may comprise a main body part secured to the mounting bracket and a second part secured to the support bracket, the second part optionally being connected to the first part by one or more frangible pins.

The blocking part may conveniently be fixed to, or comprise a part of, the main body part of the frangible connector. This allows for simple assembly of the shroud, clamp mechanism and blocking part to the connectors, before the whole assembly is offered up to the mounting bracket that may be already in place secured to a vehicle. It also provides protection to the connectors when the assembly is in transit before it is offered up to the mounting bracket. The blocking part may comprise a rigid leg which depends downward from the main body part and which carries the guide face towards a lower region.

The first part of the frangible connector may be secured to the mounting bracket by one or more screws or bolts.

The shroud may be telescopic, comprising an inner tube and an outer tube which slides over the inner tube, or vice versa. It may be adjustable for reach and the assembly may also be adjustable for rake. This can be achieved by passing the clamp bolt through slots in the arms of the support bracket. In this case, the guide face of the blocking mechanism may be shaped to conform to the path followed by the clamp bolt when adjusting for rake.

Other advantages of this invention will become apparent to those skilled in the art from the following detailed description of the preferred embodiments, when read in light of the accompanying drawings.

BRIEF DESCRIPTION OF THE DRAWINGS

FIG. 2 is a perspective view of an exemplary steering column assembly within the scope of the present invention in the clamped condition;

FIG. 3 is an enlarged perspective view of a portion of the assembly shown in FIG. 2 as bounded by the dotted line in FIG. 2;

FIG. 8 is a view from the side of the assembly of FIG. 2;

FIG. 9 is an enlarged view from the side of a portion of the assembly showing the relative location of the cap and guide face of the blocking part;

FIG. 12 is a cross section taken through the centre of the shroud and viewed from above showing the location of the clamp bolt and the impact points where the bolt engages the support bracket arms and the cap engages the blocking part when the assembly is unclamped; and FIG. 13 is a force diagram illustrating the paths and magnitude of forces that the blocking part and connectors are subjected to during a crash when a load is applied along the axis of the steering shroud.

DETAILED DESCRIPTION OF THE INVENTION

Figure 1:
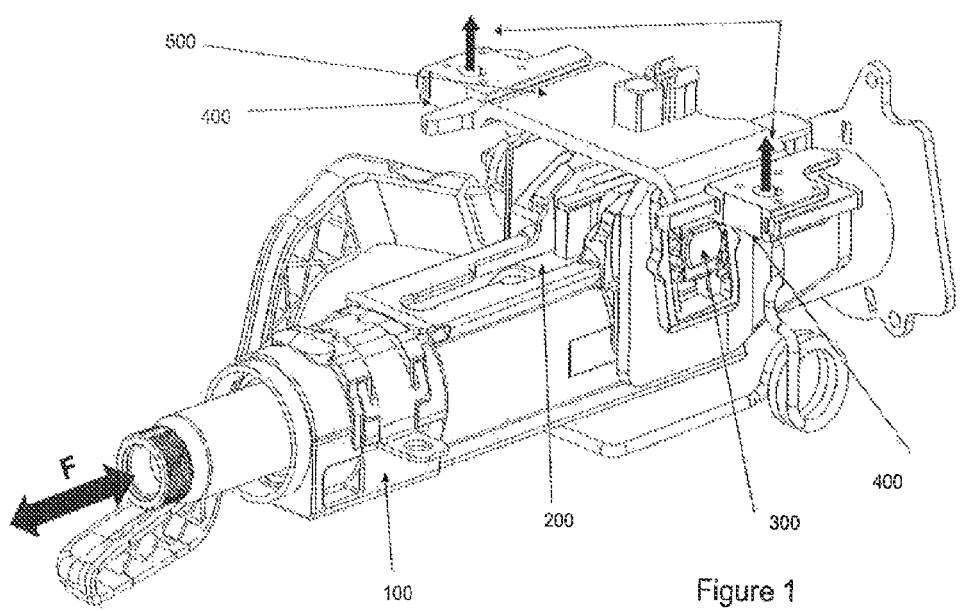
FIG. 1 is a perspective view of a steering column assembly that does not fall within the scope of the present invention.
Figures 4, 5:
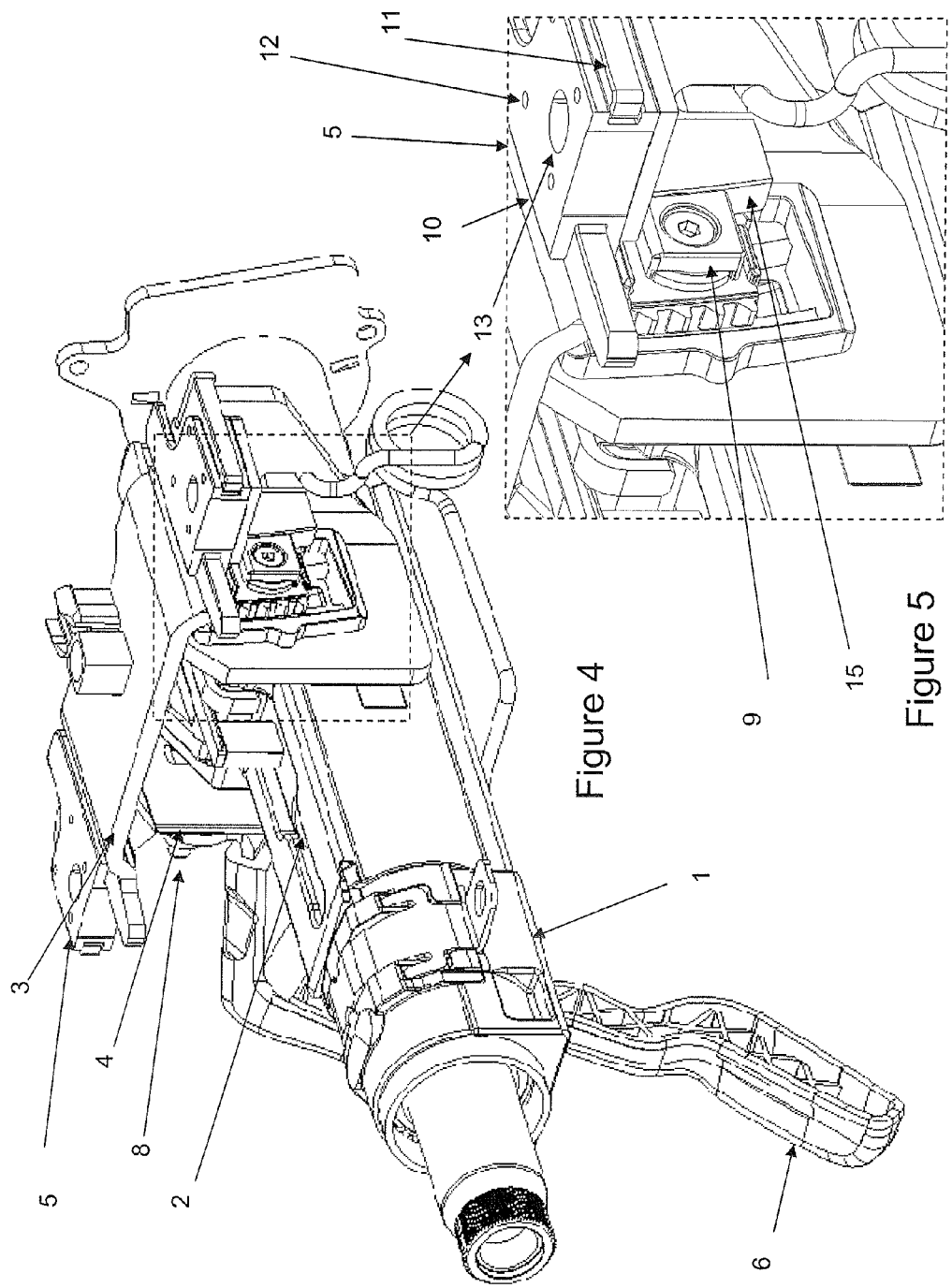
FIG. 4 is a perspective view of an exemplary steering column assembly within the scope of the present invention in the unclamped condition
FIG. 5 is an enlarged perspective view of a portion of the assembly shown in FIG. 4 as bounded by the dotted line in FIG. 4.
Figure 6:
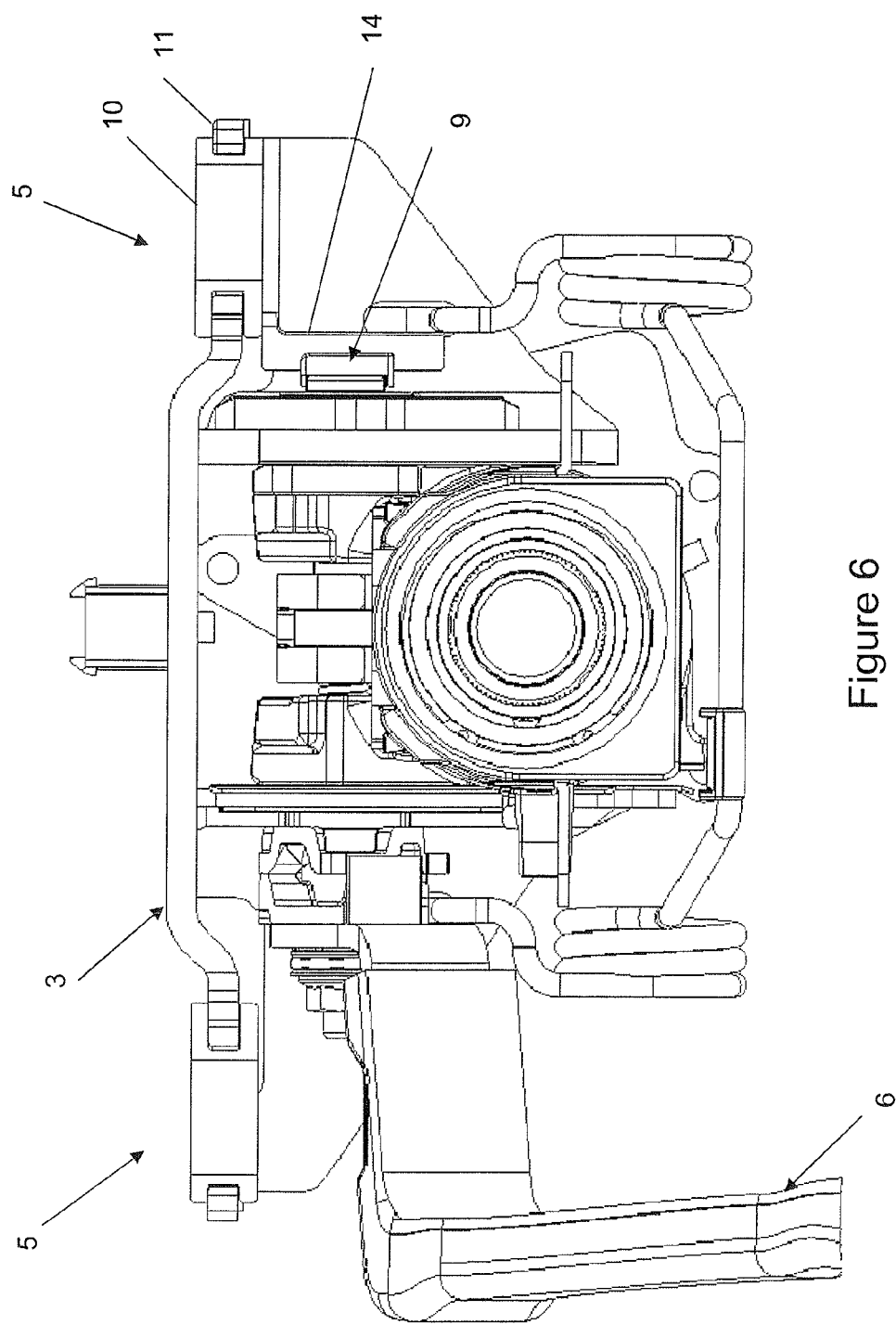
FIG. 6 is a view along the axis of the steering column shroud of the assembly of FIG. 2 in the clamped condition.
Figure 7:
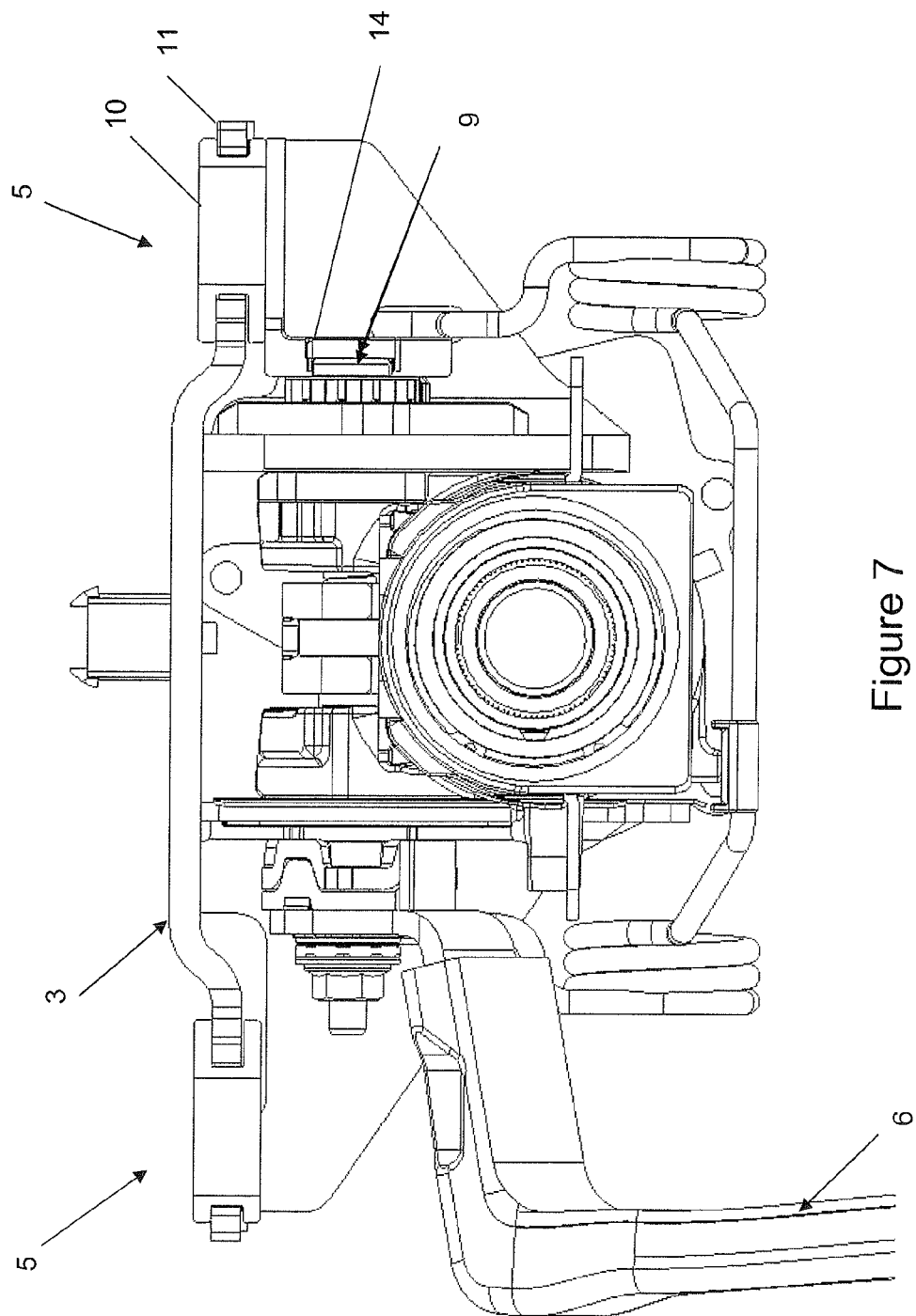
FIG. 7 is a view along the axis of the steering column shroud of the assembly of FIG. 2 in the unclamped condition
Figure 11:
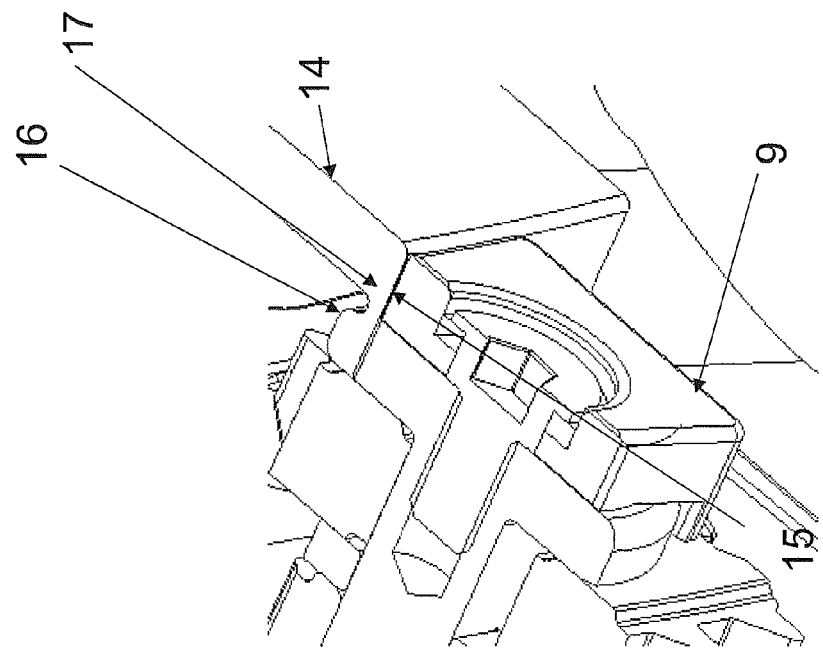
FIG. 11 is a cutaway view showing the same portion of the assembly of FIG. 4 as FIG. 10 where the cap engages the blocking part when unclamped.
Figure 10:
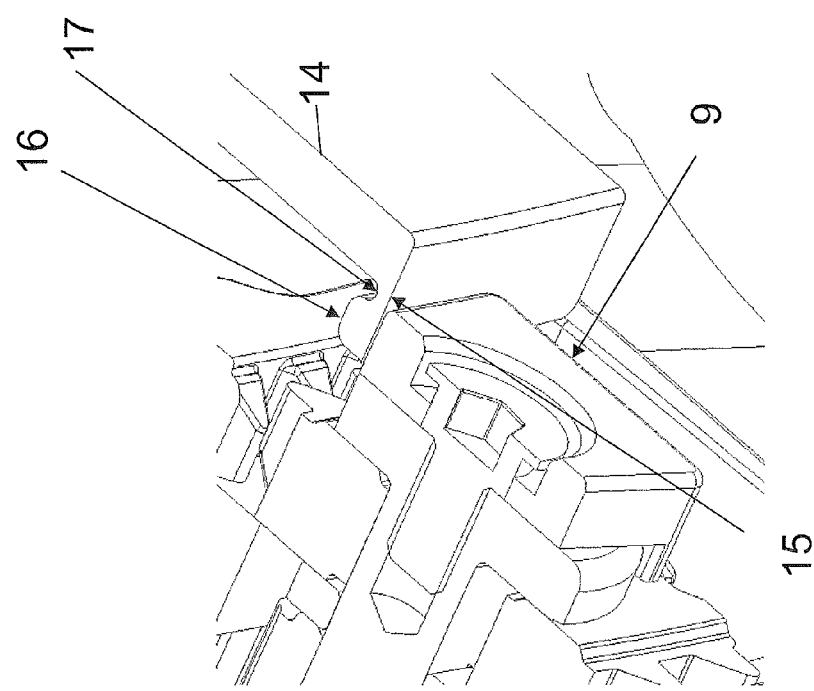
FIG. 10 is a cutaway view showing a portion of the assembly of FIG. 2 where the cap engages the blocking part when clamped.

FIGS. 2 to 12 of the accompanying drawings show an embodiment of the invention applied to a so-called double-adjustment type steering column assembly. Such columns can be adjusted for both reach (in and out) and rake angle (up and down). The invention could, equally, apply to single adjust columns. The column assembly comprises a first shroud portion 1 and a second shroud portion 2 which can telescope relative to one another to allow for reach adjustment and which can both be moved in an arc around a pivot point axis to allow for rake adjustment. The telescoping mechanism allows the adjustment of the Reach position by the driver.

The first shroud portion 1, being closest to the steering wheel, comprises an outer tube which supports the steering wheel shaft via a ball bearing. The second shroud portion 2, closer to the power assistance motor, comprises an inner tube over which the outer tube is free to slide telescopically. There may be a special bushing (not shown) between the connecting diameters of these Shrouds to minimise the sliding friction.

The inner and outer tubes 2 and 1, respectively, are fixed in position by a releasable clamp assembly, indicated generally at 18, which is operated by a locking lever 6 that can be gripped by a driver. In a disengaged (unlocked, unclamped) position the outer tube 1 is free to move telescopically through the reach adjustment stroke along the inner tube 2. When in the fully engaged (locked, clamped) position, the clamp assembly 18 secures the outer tube 1 to a so called support bracket 3 by a positive locking of inter-engaged teeth so the inner and outer tubes 2 and 1, respectively, can no longer move telescopically. It is this telescopic sliding action that enables the axial, or "Reach", position of the steering wheel to be varied.

The lower end of the inner tube 2 is pivoted from the vehicle about a transverse axis (called the Rake Pivot axis). Rotation, in a vertical plane, of the assembly comprising both shrouds results in a variation of the steering wheel height or "Rake" setting. Alternatively, it may be fixed to an electric power steering gearbox which itself is pivoted to the vehicle structure at the Rake Pivot Axis.

The support bracket 3 is secured to a mounting bracket 19 which is rigidly bolted or welded to a fixed part of the vehicle, typically the vehicle cross car beam (CCB). The bracket 3 comprises an inverted U-shaped bracket which has two arms 4 which extend downwards on either side of the shroud in the region where the inner and outer tubes 2 and 1, respectively, overlap. This bracket 3 helps to prevent the steering column from moving side to side under load. In the locked position, the clamp assembly 18 locks the inner and outer tubes 2 and 1, respectively, in position between the arms 4 of this bracket.

The support bracket 3 is fixed to the mounting bracket 19 through two frangible connectors 5, often called capsules in the art, with each positioned on a respective side of the axis of the shroud and are configured so that they are severed by the impact force of the driver striking the steering wheel. The support bracket 3 then slides forwards relative to the vehicle body. During this sliding process, the steering wheel is maintained in a substantially linear path by the combination of the telescoping of Shrouds 1 and 2 and the side slots in the capsules guiding the support bracket as they move relative to one another.

The clamping mechanism 18 is designed so that one lever 6 simultaneously releases or locks the first portion (the upper shroud) to the second and third portions (lower shroud portion and rake bracket) in respect of both the Rake and the Reach directions. The clamping system 18 comprises a clamp bolt 7, visible most clearly in FIG. 12, which passes through a slot in each arm 4 of the Bracket 3 and a slot in each side of a reach bracket which is attached to the outer tube 1.

An adjusting nut 8 is provided at one end of the bolt 7 and a cap 9 at the other. Although not essential in all envisaged embodiments, it is also useful to prevent rotation of the clamp bolt in order to set the adjusting nut during manufacture, without the need to temporarily clasp the clamp bolt 7. A cam mechanism is located on the clamp bolt 7 between the nut 8 and the outer face of the nearest one of the arms of the rake bracket 3. The cam mechanism comprises a pair of face-cams, one of which is prevented from rotating while the other is attached to the handle 6. The length of the cam mechanism (along the axis of the bolt) can be adjusted by rotation of the handle 6. The moving cam part of the cam mechanism abuts a thrust bearing which in turn abuts the adjusting nut which is screwed onto the threaded end of the clamp bolt 7. As the cam assembly lengthens when the lever is rotated to a locked position, it applies tension to the clamp bolt, drawing the cap 9 towards the nut and so squeezing the arms of the rake bracket onto the sides of the reach bracket. When unclamped the cap 9 moves outwards.

The outer tube 1 includes an elongate slot (not shown) in a position which passes between the arms of the bracket 3 so that as the arms are squeezed together the slot tends to at least partially close. This clamps the outer tube 1 onto the inner tube 2 and helps prevent relative movement of the inner and outer tubes, fixing the length of the steering assembly. Some form of positive locking may also be provided as required, such as rows of locking teeth as is known in the art.

FIG. 3 shows in more detail a portion of the assembly including one of the frangible connectors 5 that is furthest from the locking lever 6.

The connector 5 comprises a main body part 10 that is cast or machined in the form of two larger plates between which is sandwiched a small central portion. A female profile cut out from a wing 11 of the support bracket 3 is butted up to a corresponding male profile which is formed in the central portion of the main body 10. After mating the main body 10 to the wing 11 of the support bracket 3, a frangible material, indicated at 20, such as a plastic is injected through holes 12 in the wing and the main body part which are co-axial. There may be more than one group of such coaxial holes. Once set, the plastic acts as a fusible dowel which is designed to shear when the said prescribed level of force is applied. Typically, the plate thickness of the wing 11 of the bracket is slightly less than the gap between the upper and lower plate portions of the main body so that a proportion of the injected plastic spreads into the said gap and improves the stiffness of the connection between the capsule and the first bracket part. The connector includes an additional large hole 13 in the main body part which receives a fastening bolt (not shown) that is secured to the mounting bracket 19. Other forms of connector are, or course, possible within the scope of the invention.

The main body part 10 also includes a blocking mechanism which includes a rigid leg 14 that extends downwards from the main body 10 towards the cap 9 at the end of the clamp bolt 7. The leg terminates with a guide face 15 which engages a side of the cap 9 that faces away from the steering wheel end of the shroud 2 and 1, respectively. The leg includes a portion 16 which projects sideways from the end of the leg and is connected to the leg through deliberately weakened section 17 of reduced thickness, with the guide face 15 extending across from the leg to the weakened portion. This can best be seen in FIGS. 10 and 11 of the drawings. The blocking mechanism is located outside of the arms of the support bracket, generally below the connector. The weakened portion of the blocking mechanism sits closer to the support bracket arm than the much stronger leg portion.

The guide face is curved to correspond with path along which the clamp bolt travels when adjusted for rake. At all times the cap preferably contacts the guide face or is located a minimal distance from the face.

In use, with the clamp mechanism 18 in a clamped or locked condition the cap 9 sits on the weakened region of blocking mechanism, and does not contact the relatively stronger leg 14. In the event of a large force being applied along the axis of the shroud, for example in a crash, the force will be transferred to the clamp mechanism 18 and in turn to the weakened portion of the blocking mechanism through the cap 9. This weakened portion is arranged so that it will shear from the leg when under a high load, and as it does so it allows all of the load to pass from the clamp mechanism 18 through the support bracket to the frangible connectors. If the load exceeds the designed break point of the connectors they will shear allowing the shroud to move, together with the support bracket, away from the driver.

On the other hand, when the clamp mechanism 18 is unclamped or unlocked the cap 9 protrudes further away from the support bracket arms to contact the portion of the guide face that is carried by the stronger leg 14. A force applied at this time to the shroud, which causes it to reach the end of its travel, will act upon the clamp bolt 7 and pass through the cap 9 to the leg 14. As the leg is strong it will easily carry this force without significant deformation. This protects the frangible connectors 5.

In practice, as the cap presses on the leg 14 the clamp bolt will continue to move slightly as shown in FIG. 12. The bolt will pivot about the region of contact between the cap 9 and guide face 14 so that some load is applied from the clamp bolt through the support bracket 3 to the connectors 5. The points at which the load are applied are marked as impact points 1, 2 and 3 in FIG. 12 and FIG. 13. In the example shown, only a smaller force is applied to the connector that does not have the blocking mechanism associated with it due to the greater distance of the connector from the axis of the shroud along which the force is applied.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

The invention claimed is:

1. A collapsible steering column assembly for a vehicle comprising:
   a shroud which surrounds a steering column shaft,
   a mounting bracket secured to or integral with a fixed part of the vehicle,
   a support bracket secured to the mounting bracket through one or more frangible connectors which are adapted to break when subject to a predefined load to permit the support bracket to move relative to the mounting bracket,
   a clamp mechanism which releasably secures the shroud to the support bracket,
   when unclamped the shroud being movable relative to the support bracket to permit the assembly to be adjusted for reach and when clamped the shroud being fixed in position relative to the support bracket, and
   a blocking part which is fixed in position relative to the mounting bracket and forms an integral part of the mounting bracket or a part of a component that is fixed rigidly to the mounting bracket and at least in an unclamped condition of the clamp mechanism provides an additional force path between the clamp mechanism and the mounting bracket that does not pass through the support bracket,
   whereby in the event that an axial load is applied to the steering assembly when the clamp mechanism is unclamped and has reached the end of its allowable travel at least some of the load is carried through the clamp mechanism and the blocking part to the mounting bracket along the additional force path so as to protect the frangible connectors from breaking.

2. The collapsible steering column assembly according to claim 1 in which at least one of the frangible connectors comprises a main body part secured to the mounting bracket and a second part secured to the support bracket, the second part optionally being connected to the first part by one or more frangible pins, and in which the blocking part is fixed to, or comprises a part of, the main body part of the frangible connector.

3. The collapsible steering column assembly according to claim 2 in which the blocking part comprises a rigid leg which depends downward from the main body part.

4. The collapsible steering column assembly according to claim 1 in which the blocking part comprises a first portion which will break away when subject to a relatively low load and a second portion which is relatively stronger, the clamp mechanism when in the clamped condition engaging only the first portion of the blocking part and when in the unclamped position engaging the relatively stronger portion, such that in the event that the axial load is applied to the steering column assembly whilst the clamp mechanism is clamped the first portion of the blocking part will break away from the mounting bracket and subsequently permit the load to pass through the clamp mechanism to the mounting bracket through the frangible connectors.

5. The collapsible steering column assembly according to claim 1 in which the blocking part defines a guide face along which a part of the clamp mechanism will slide upon moving from the clamped to unclamped conditions and during adjustment for reach that extends continuously from a second portion to a first portion of the blocking part.

6. The collapsible steering column assembly according to claim 1 in which the clamp mechanism includes a clamp bolt and the shroud includes at least one elongate slot through which the bolt passes, limits of reach adjustment being defined by the positions in which the bolt is located at the ends of the slot, the shroud being located between two downwardly depending arms of the support bracket, each arm including a further opening through which the clamp bolt passes, and at least a part of a guide face of the blocking part engaging the clamp bolt in a region that lies outside of the two arms of the support bracket and towards one end of the bolt.

7. The collapsible steering column assembly according to claim 6 in which the clamp bolt includes a head or cap which engages the guide face, the head or cap engaging the guide face in a first portion of the blocking part when clamped and moving along an axis of the clamp bolt when moved to the unclamped position to engage the guide face in a second portion of the blocking part.

8. The collapsible steering column assembly according to claim 7 in which the cap includes a low friction guide surface.

9. The collapsible steering column assembly according to claim 6 in which the blocking part is located towards one end of the clamp bolt, the support bracket is connected to the mounting bracket by the one or more frangible connectors, each one offset from and on opposing sides of an axial centre line of the shroud, and in which the frangible connector that is furthest from the blocking part is offset from the centre line of the shroud by a greater distance than where the clamp bolt contacts the blocking part is offset from the centre line.

* * * * *